United States Patent
Makino et al.

(10) Patent No.: US 6,386,626 B1
(45) Date of Patent: May 14, 2002

(54) SUNSHADE FOR VEHICLE SUNROOF

(75) Inventors: Hiroshi Makino, Nagoya; Takashi Kitani, Kariya; Youji Nagashima, Toyota; Kenji Maeda, Kariya; Masashi Uemura, Kasugai; Mamoru Kameyama, Kasugai; Tatsuro Itoh, Kasugai, all of (JP)

(73) Assignees: Aisin Seiki Kabushiki Kaisha; Howa Textile Industry Company, Ltd., both of Aichi-ken (JP)

( * ) Notice: Subject to any disclaimer, the term of this patent is extended or adjusted under 35 U.S.C. 154(b) by 0 days.

(21) Appl. No.: 09/713,221

(22) Filed: Nov. 16, 2000

(30) Foreign Application Priority Data

Nov. 18, 1999 (JP) .......................... 11-328719

(51) Int. Cl.$^7$ ................................ B60J 7/00
(52) U.S. Cl. .................................... 296/214
(58) Field of Search ................. 296/211, 214

(56) References Cited

U.S. PATENT DOCUMENTS 4,717,200 A * 1/1988 Kruger ...................... 296/214
6,155,636 A * 12/2000 Stehning et al. ............ 296/214

FOREIGN PATENT DOCUMENTS

| JP | 1-27463 | 8/1989 |
| JP | 9-71135 | 3/1997 |
| JP | 2816126 | 8/1998 |

* cited by examiner

*Primary Examiner*—Dennis H. Padder
(74) *Attorney, Agent, or Firm*—Finnegan, Henderson, Farabow, Garrett & Dunner, L.L.P.

(57) ABSTRACT

A sunshade for a vehicle sunroof is structured to have a base member for shielding sunlight from striking the inside of the vehicle through an opening formed in the vehicle body when the sunshade is closed, which is housed within a housing space formed adjacent to the opening when the sunshade is opened, and an edge member integrally provided with a handle, which has a shield integrally mounted on the advancing-side end portion of the base member to shield the advancing-side terminal portion from the view of the vehicle occupant. This construction of the sunshade improves the productivity and reduces the cost of the sunshade.

13 Claims, 12 Drawing Sheets

SUNSHADE FOR VEHICLE SUNROOF

BACKGROUND OF THE INVENTION

1. Field of the Invention

The present invention relates to a sunshade for a vehicle sunroof.

2. Description of the Related Art

Generally, a sunshade for a vehicle sunroof is retractably mounted on guide rails provided at both sides of an opening formed in a vehicle body (the ceiling of a vehicle). It can be manually opened/closed, having a handle at a portion exposed inside the vehicle when the shade is opened. For example, the sunshade for a vehicle sunroof disclosed in Japanese Unexamined Patent Publication No. HEI 9-71135 is composed of a core material which is substantially flat-plate shaped and formed from a material with high-strength (metal) such as aluminum, and a skin material that covers the core material. It is provided with a sunshade body having a handle formed to expand upward and 4 shoes in two pairs mounted on both sides of the sunshade body. It can be retractably (slidably) mounted on the guide rails by the shoes.

The sunshade body of the aforementioned sunshade has a structure in which the skin material is adhered to the core material to be covered therewith. In addition, in order to prevent the terminal portions of the skin material from peeling off and to improve the appearance, they are rolled into the back of the core material (the surface which cannot be directly viewed by occupants of the vehicle). Therefore, the productivity of the sunshade body is low, requiring improvement.

Furthermore, the core material of the sunshade body of the aforementioned sunshade is formed from the light and highly rigid material such as aluminum (other materials may be used, however, they are expensive). As the core material is provided for the entirety of the sunshade body, a large amount of the material is required. It is difficult to reduce the weight and cost of the sunshade.

SUMMARY OF THE INVENTION

The invention is conceived in view of the aforementioned circumstances. Therefore, it is an object of the invention to provide a sunshade for a vehicle sunroof, allowing for improved productivity, and reduced cost of the sunshade.

In order to achieve the aforementioned object, the sunshade for a vehicle sunroof is provided with a base member which advances and retreats on guide rails provided along both sides of an opening formed in the vehicle body to open and close the opening so as to shield sunlight from striking inside the vehicle through the opening when the sunshade is closed, and is housed within a housing space formed adjacent to the opening when the sunshade is opened; and an edge member which is integrally mounted on the advancing-side end portion of the base member, and has a cover portion for covering the inside of the vehicle of the advancing-side terminal portion of the base member.

According to the above-identified aspect, an edge member having a handle is provided with a shielding portion that shields the advancing-side terminal portion of the base member from the view of the vehicle occupant. This may eliminate the machining step for the terminal portion at the advancing-side of the base member for improved appearance, resulting in improved productivity and the reduced cost of the sunshade.

In this case, it is preferable that ventilation openings be integrally formed with the edge member, or the base member is formed into a substantially flat plate, the edge member is formed into a convex shape projecting further than the base member toward the inside of the vehicle such that the handle and ventilation openings are housed within the convex portion.

According to the aspect of the invention, in the case where ventilation openings are integrally provided on the edge member, the sunshade can be constructed at a low cost without demanding the ventilation openings separately. Furthermore, according to this aspect, in the case where the base member is formed into a substantially flat plate, the edge member is formed into a convex shape projecting further than the base member toward the inside of the vehicle, and the handle and ventilation openings are housed within the convex portion, the rigidity of the edge member at the sunshade can be secured by effectively utilizing the space inside the vehicle defined by the guide rails, the ceiling interior member which is disposed at the lower side of the frame that supports the guide rails and expands toward the inside of the vehicle, and a trimming member attached to the opening circumferential edge of the ceiling interior member. The compact arrangement of the handle and ventilation openings may further suppress increase in the thickness.

In addition, it is preferable that the edge member be formed of a material with high-strength. In this case, it is further preferable that the engagement portions engaged with closing-direction stoppers on the frame that supports the guide rails be integrally formed with the edge member, or the edge member is extended to the guide rails so as to integrally provide shoes with the extended portions to slidably engage with the guide rails. Furthermore, it is preferable to use a resin with high-strength as the high-strength material constituting the edge member.

According to the aspect of the invention, in the case where the edge member having the handle is formed of the material with high-strength, the base member can be formed of the material with low-strength which is lightweight and inexpensive. Therefore, this makes it possible to achieve reduction in the weight and cost of the sunshade. When engagement portions that engage with the closing-direction stoppers on the frame that supports the guide rails are integrally provided with the edge member, the closing-direction stopper can be simply structured at a low cost, taking advantage of the edge member formed of the high-strength material.

When the edge member is extended to the guide rails slidably engaged with shoes which are integrally provided on the extended portions, the shoes can be simply structured at a low cost, taking advantage of characteristics of the edge member formed of the material with high strength.

Furthermore, when the high-strength material constituting the edge member is formed of a resin with high-strength, it is needless to say that the edge member be excellent in productivity and manufacturable at a low cost. In addition, the engagement portions that engage with the closing-direction stoppers and shoes that slidably engage with the guide rails can be integrally formed on the edge member during molding thereof, thus reducing the number of parts.

DETAILED DESCRIPTION OF THE PREFERRED EMBODIMENTS

Figure 1:
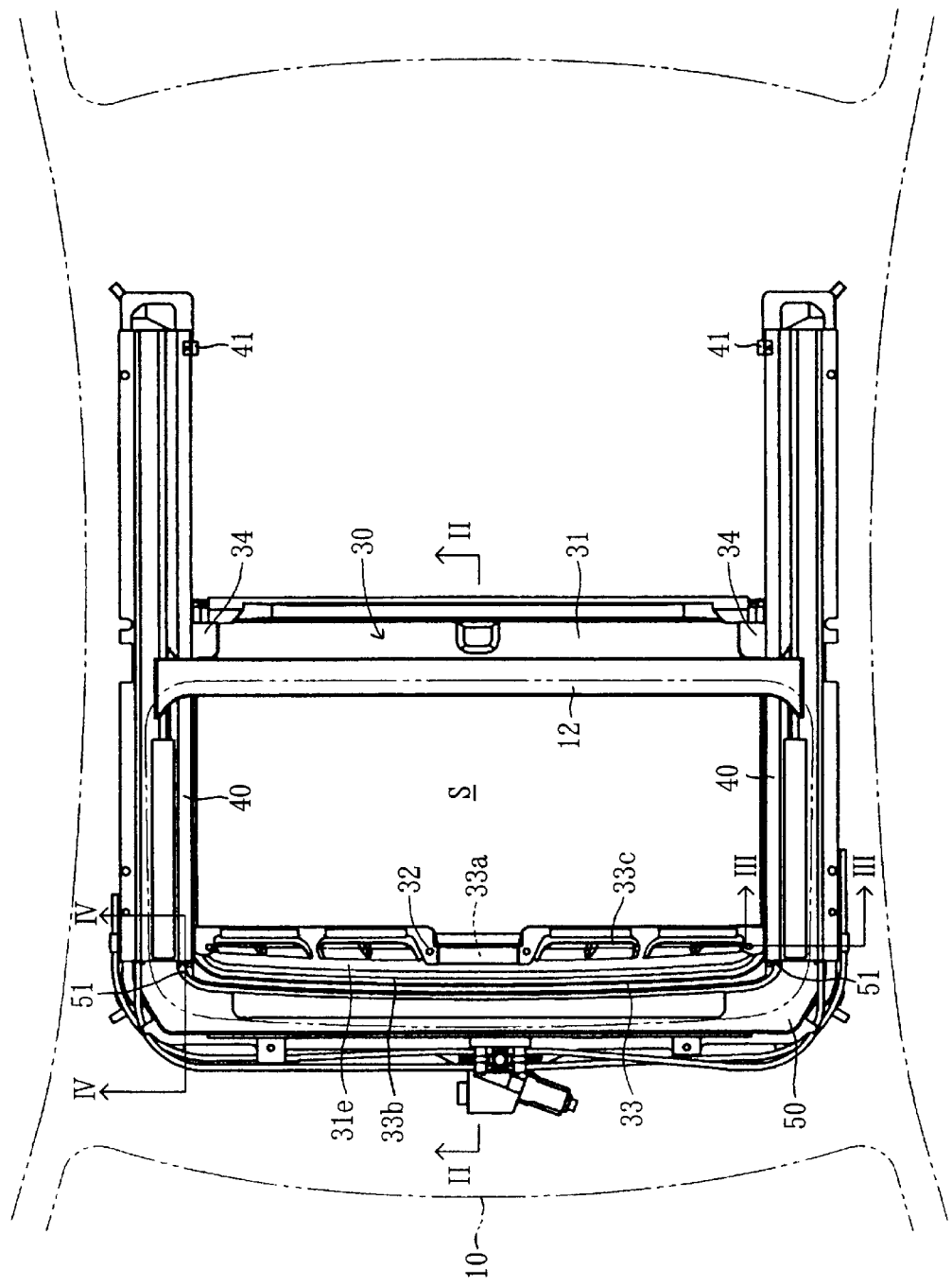
FIG. 1 is a plan view of a vehicle sunroof including the sunshade of the invention.
Figure 2:
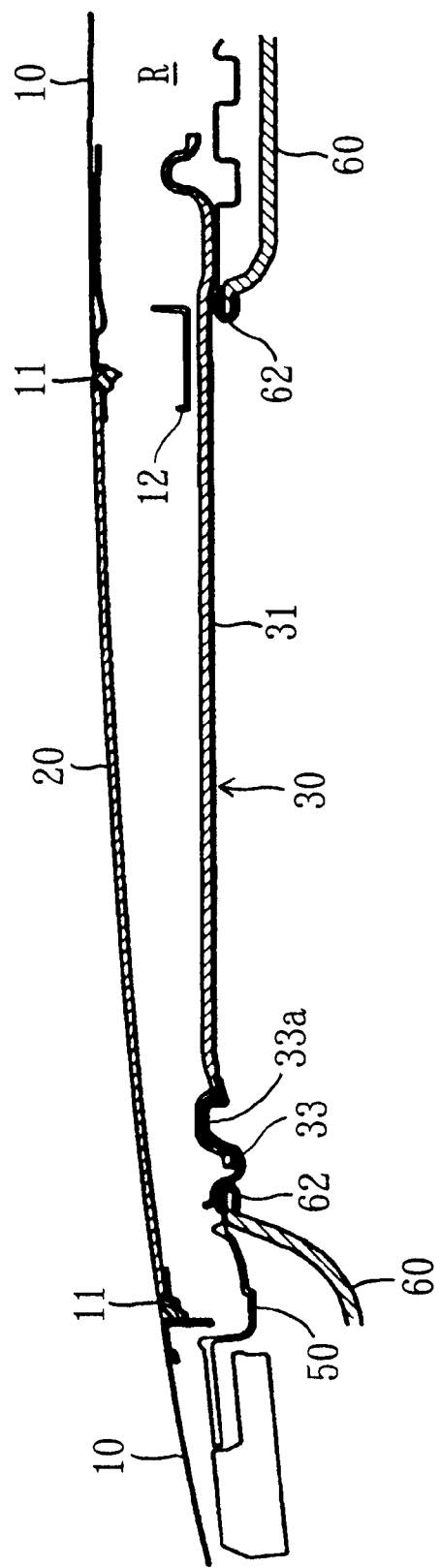
FIG. 2 is a longitudinal side elevation along the line II—II of the vehicle sunroof shown in FIG. 1.

Hereinafter, an embodiment of the invention will be described referring to the drawings. FIG. 1 through FIG. 4 show a vehicle sunroof including the sunshade of the invention. In this sunroof, a lid 20 mainly formed of a transparent or semitransparent glass plate is attached in a generally known manner, enabling it to open and close on a roof opening 11 (see the imaginary line of FIG. 1) formed at the roof panel 10, and a sunshade 30 is disposed at the vehicle's inner side of the lid 20.

The sunshade 30 is mounted inside the grooves of a pair of right and left guide rails 40 in a retractable manner backward and forward, whereby the sunshade can be manually opened and closed. The guide rails 40 are mounted to the ceiling component (not illustrated) of the vehicle body via a frame 50, and are interposed between the roof panel 10 and ceiling interior member 60, longitudinally extending along the right and left sides of the opening S formed in the vehicle body. The opening S formed in the vehicle body is composed of the roof opening 11 formed in the roof panel 10 and interior opening 61 formed in the ceiling interior member 60, and trimming member 62 is mounted to the circumferential edge of the interior opening 61.

In the present embodiment, as shown in FIG. 1 through FIG. 4, and FIG. 5 through FIG. 12, the sunshade 30 is composed of a base member 31 formed into a substantially flat plate shape, an edge member 33 which is integrally mounted to an advancing-side end portion (front end portion) 131 of the base member 31 using four screws 32, and a pair of right and left guide shoes 35 which are integrally mounted to the retreating-side end portion (rear end portion) of the base member 31 using holder plates 34.

The base member 31 is composed of a base layer 31A and a skin layer 31B as a main portion of the sunshade 30. In a closed state, it shields sunlight from striking the inside of the vehicle through the opening S. In an open state, it is housed in the housing space R (see FIG. 2) formed adjacent to the opening S. The base layer 31A is represented as a single layer in the figures. Specifically, however, it is formed by pouring urethane foam between two upper and lower glass mats (three-layer structure), and is molded into a predetermined shape. As the skin layer 31B, the material of the same type as that of the skin layer used for the ceiling interior member 60 (for example, fabric) is employed, which is adhered to the base layer 31A facing the inner side of the vehicle.

The advancing-side end portion of the base member 31 is molded into the shape substantially matched at the upper surface shape of the edge member 33, and has four openings 31a formed therein. Furthermore, the retreating-side end portion of the base member 31 (the portion which is always housed within the housing space R and invisible from the vehicle occupant) has a reinforcing convex portion 31b that extends horizontally and projects upward, and a receiver 31c that projects downward at substantially the center location (the portion to define the space by the sunshade 30 and the trimming member 62 in an complete closed state of the sunshade 30 formed therein. It is further provided with attachment holes 31d for attachment of guide shoes 35.

The edge member 33 is integrally molded from a resin with high-strength (for example, a polycarbonate ABS alloy resin) into a convex shape so as to project to the inner side of the vehicle further than the base member 31. It is provided with a handle 33a, shield 33b, four ventilation openings 33c, a pair of right and left shoes 33d, four receivers 33e, and four bosses 33f. Furthermore, the edge member 33 houses an advancing-side terminal portion 31e of the base member 31 (the portions including the portions where the front edge and openings 31a of the base member 31 are formed).

The handle 33a is formed to expand upward at substantially the center of the edge member 33 and opens downward. It is housed within the convex portion of the edge member 33 which is exposed inside the vehicle in an open state of the sunroof. The shield 33b spans between both left and right ends of the edge member 33, and is formed into the shape that matches at the front edge of the interior opening 61 formed in the ceiling interior member 60 to shield the advancing-side terminal portion 31e of the base member 31 from the field of vision of the vehicle occupant. The ventilation openings 33c are formed to match at the openings 31a of the base member 31. It is housed within the convex shape portion of the edge member 33, whereby the inside of the vehicle can be ventilated in a closed state of the sunshade 30.

Figure 3:
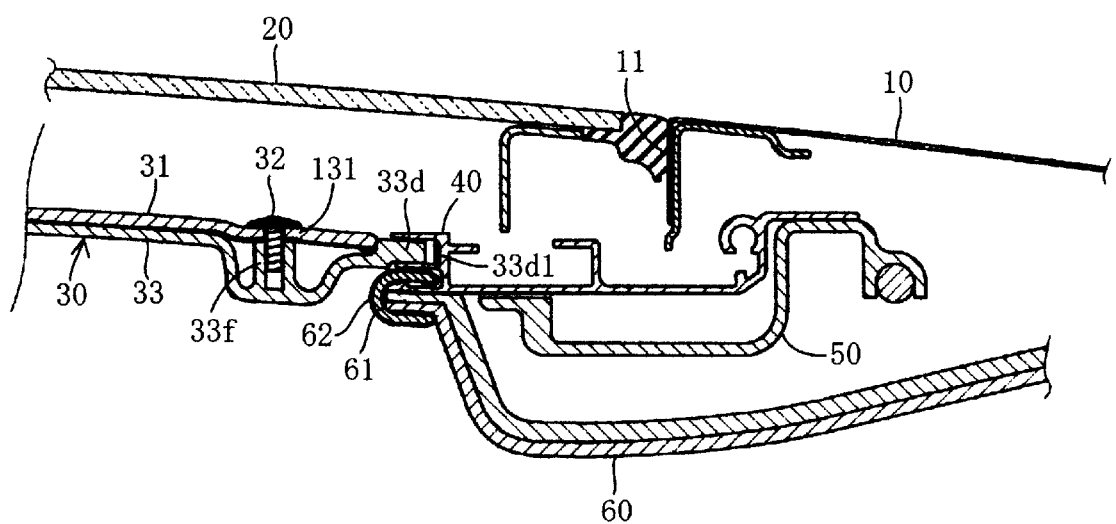
FIG. 3 is a longitudinal front elevation along the line III—III representing the details of the relationship between the sunshade and guide rails shown in FIG. 1.
Figure 4:
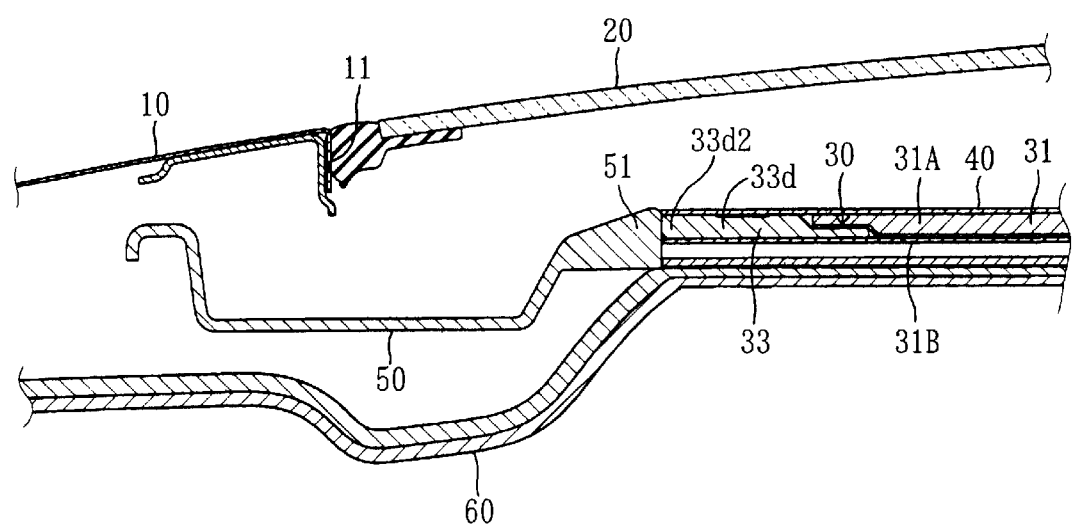
FIG. 4 is a longitudinal side elevation along the line IV—IV representing the details of the relationships of the sunshade, guide rails, and close-direction stoppers shown in FIG. 1.
Figure 5:
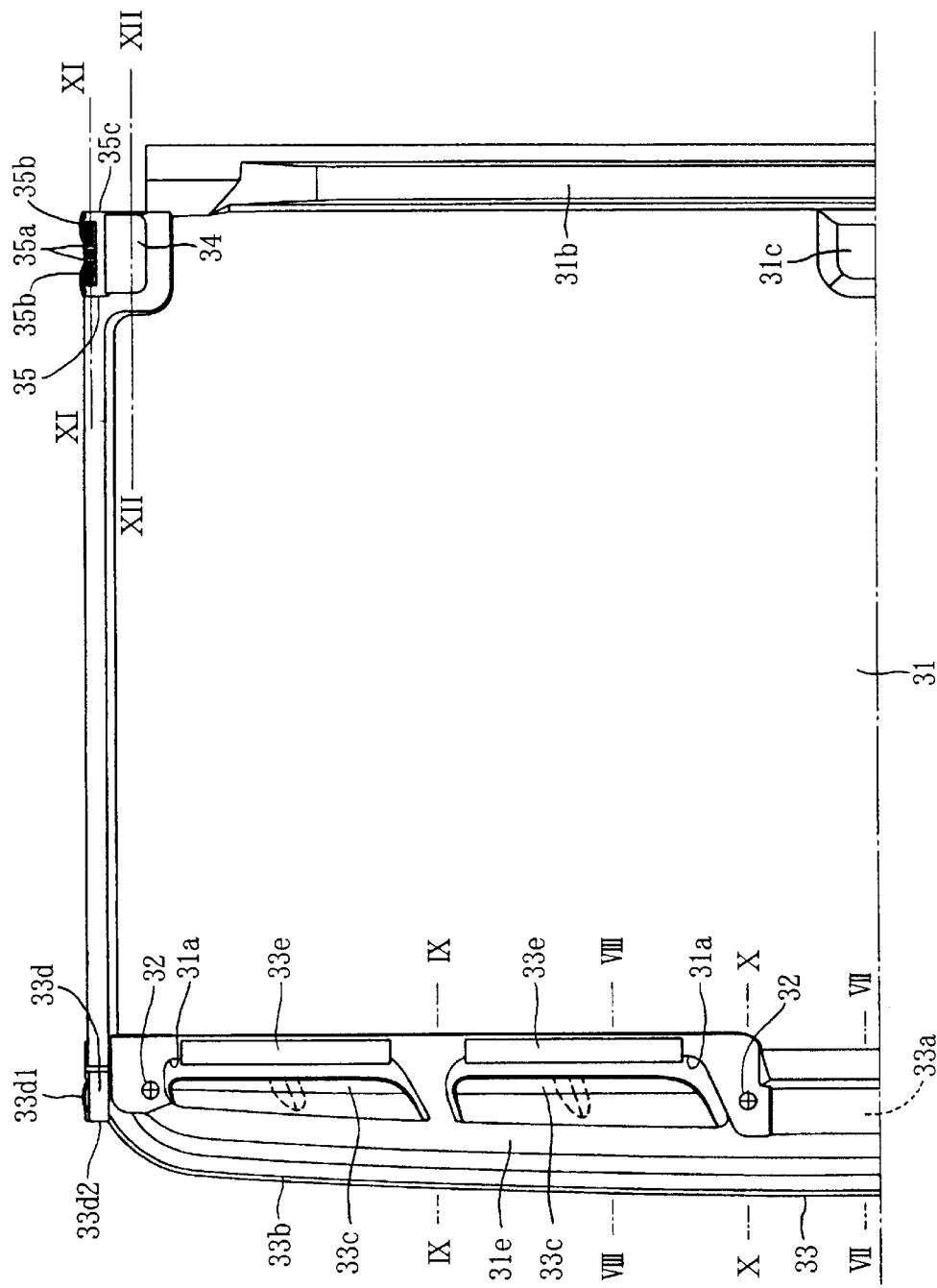
FIG. 5 is a partially enlarged plan view of the sunshade shown in FIG. 1.
Figure 6:
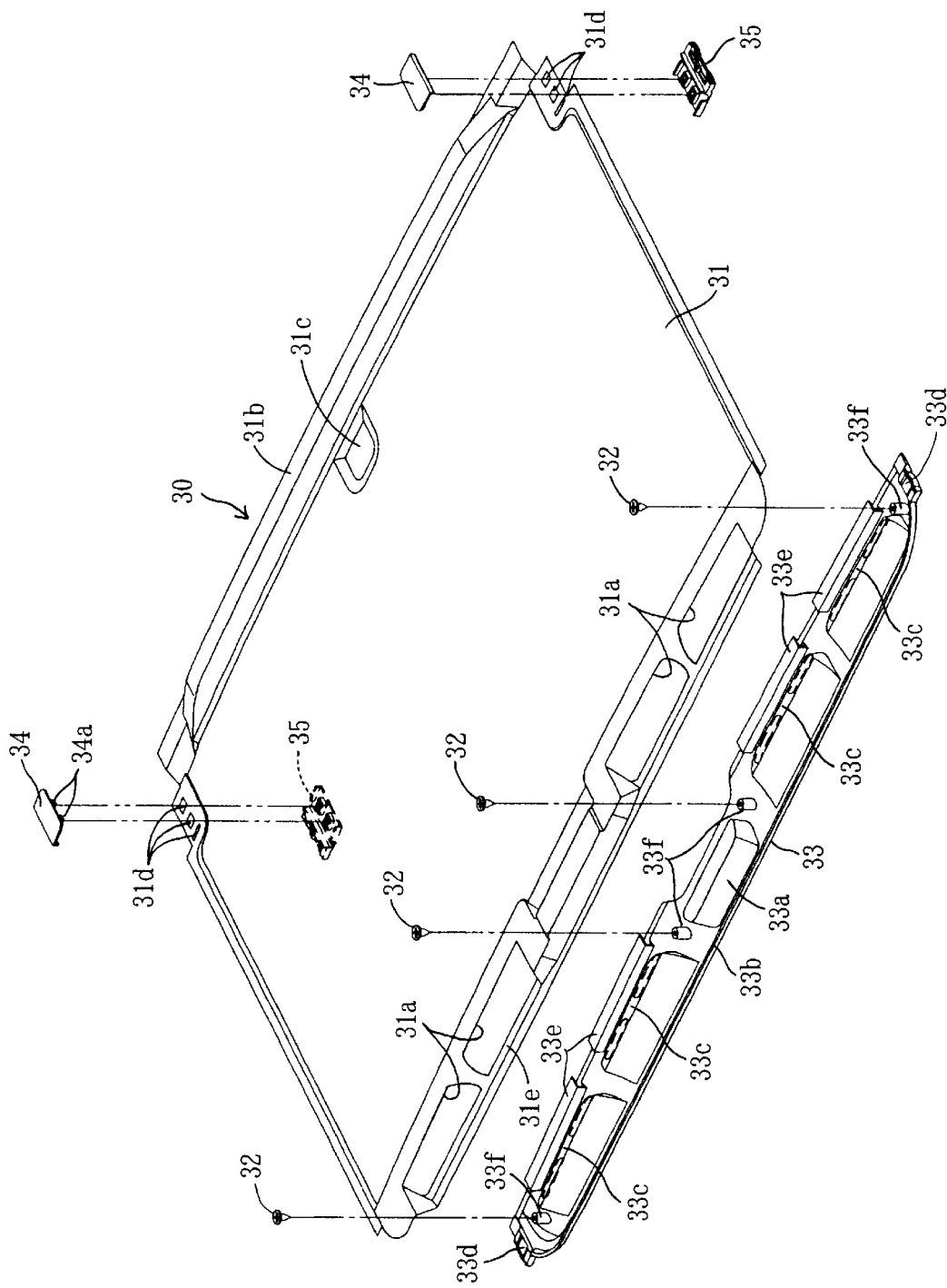
FIG. 6 is an exploded perspective view of the sunshade shown in FIG. 1.
Figure 7:
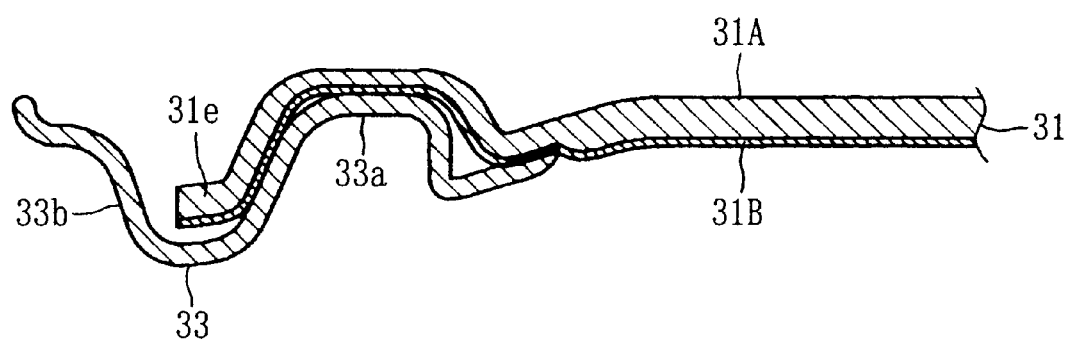
FIG. 7 is a longitudinal end elevation along the line VII—VII of the sunshade shown in FIG. 5.

The shoes 33d are formed at both ends of the edge member 33, that is, at the ends extending to the guide rails 40. As shown in FIG. 3, they are slidably mounted on the guide rails 40, and have bent pieces 33d1 in an integrated manner that elastically engage with the bottom surfaces of the grooves of the guide rails 40 to suppress lateral vibrations in an opened/closed state. In addition, the shoes 33d have engagement portions (contact surfaces) 33d2 that engage with the closing-direction stoppers 51 provided on the frame 50. Engagement (contact) between the engagement portions 33d2 and closing-direction stoppers 51 may restrict the movement in the closing direction of the sunshade 30.

Figure 8:
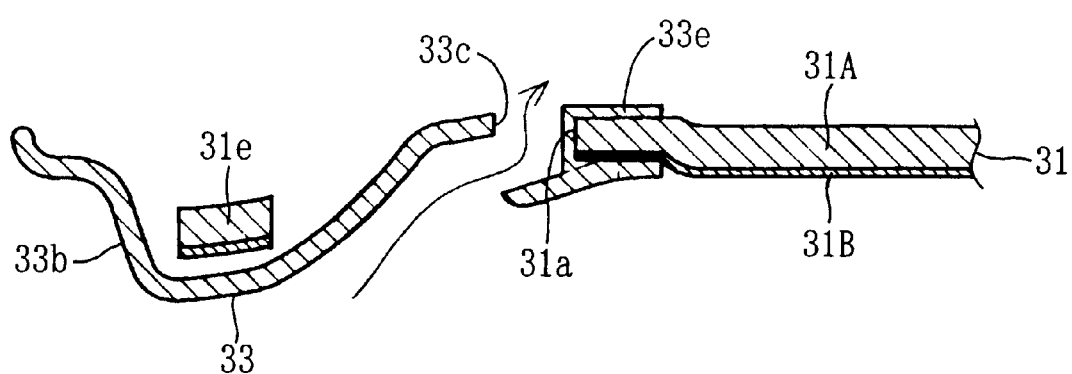
FIG. 8 is a longitudinal end elevation along the line VIII—VIII of the sunshade shown in FIG. 5.
Figure 9:
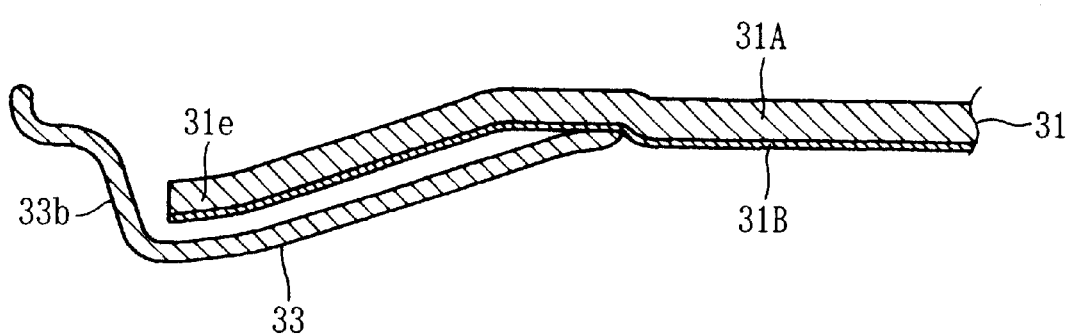
FIG. 9 is a longitudinal end elevation along the line IX—IX of the sunshade shown in FIG. 5.
Figure 10:
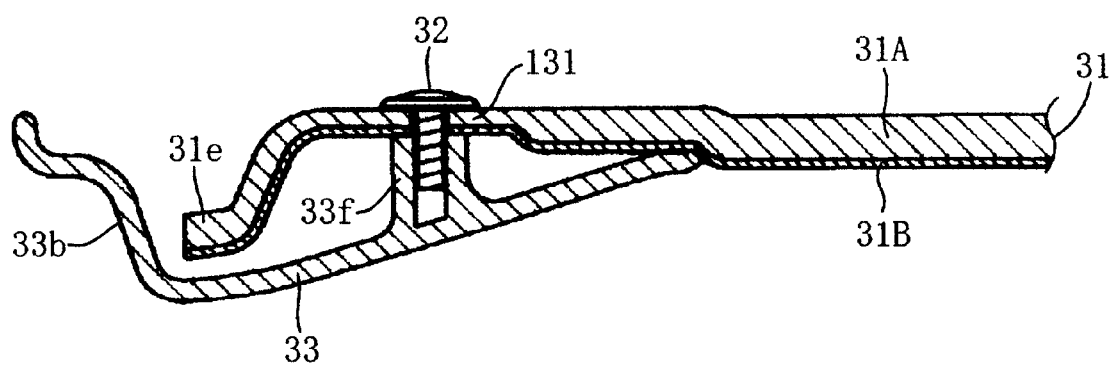
FIG. 10 is a longitudinal end elevation along the line X—X of the sunshade shown in FIG. 5.
Figure 11:
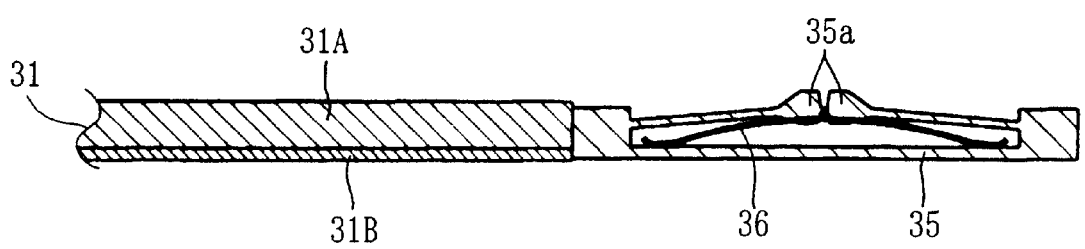
FIG. 11 is a longitudinal end elevation along the line XI—XI of the sunshade shown in FIG. 5.
Figure 12:
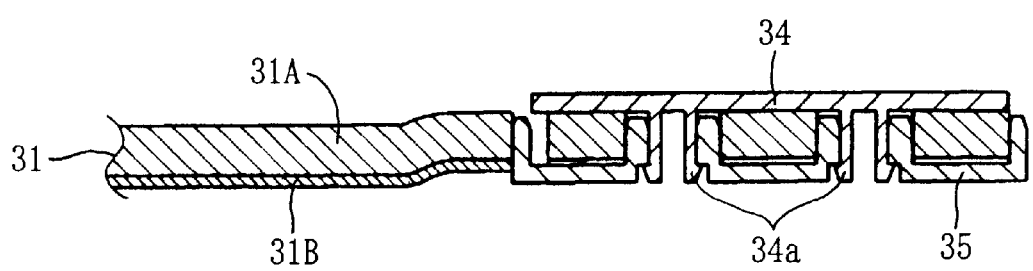
FIG. 12 is a longitudinal end elevation along the line XII—XII of the sunshade shown in FIG. 5.

The receivers 33e are formed to match at the openings 31a of the base member 31, and as shown in FIG. 8, have shapes which are concave forward and open rearward, which engage with the rear end faces of the openings 31a of the base member 31. Therefore the edge member 33 is positioned with respect to the base member 31. The bosses 33f are formed at both sides of the handle 33a and the inner sides of the shoes 33d, which project upward and have inner holes through which screws 32 are tightened.

The holder plates 34 are used for attaching the guide shoes 35 to the base member 31. They are molded from polyacetals, each of which has a pair of pins 34a (see FIG. 12) that elastically engage with the attachment portions of the guide shoes 35. The guide shoes 35 are molded from polyacetal, each of which has a pair of projections 35a integrated therewith. They are urged upward by a leaf spring 36 (see FIG. 11) mounted inside for adjusting sliding resistance, and elastically engage with the upper surfaces of the grooves of the guide rails 40. Additionally each guide shoe has a pair of bent pieces 35b integrated therewith, which elastically engage with the bottom surfaces of the grooves of the guide rails 40 to suppress lateral vibrations generated when the sunshade is opened and closed. Furthermore, the guide shoes 35 has engagement portions (contact surfaces) 35c which engage with the opening-direction stoppers 41 provided on the guide rails 40, and by engagement (contact) between the engagement portions 35c and opening-direction stoppers 41, the movement in the opening-direction of the sunshade 30 is restricted.

In the sunshade 30 of the thus constructed embodiment, the shield 33b is provided at the edge member 33 mounted on the advancing-side end portion of the base member 31 to shield the advancing-side terminal portion 31e of the base member 31 from the view of the vehicle occupant. The terminal machining at the advancing-side terminal portion 31e of the base member 31 for improving the appearance can be eliminated. Therefore productivity of the sunshade 30 can be improved, reducing the cost thereof.

Furthermore, the ventilation openings 33c are integrally provided on the edge member 33, eliminating the need of providing additional ventilation openings 33c. The sunshade 30, thus, can be manufactured at a low cost. In addition, the base member 31 is formed into a substantially flat plate, and the edge member 33 is formed into a convex shape to project further than the base member 31 toward the inside of the vehicle such that the handle 33a and ventilation openings 33c are housed therein. This makes it possible to effectively utilize the space inside the vehicle defined by the guide rails 40, the ceiling interior member 60 disposed at the lower side of the frame 50 that supports the guide rails and expands toward the inside of the vehicle, and a trimming member 62 attached to the opening circumferential edge of the ceiling interior member 60. Then rigidity of the edge member 33 of the sunshade 30 can be secured. Compact arrangement of the handle 33a and ventilation opening 33c on the edge member 33 may suppress the increase in the thickness.

Furthermore, the base member 31 is formed into a substantially flat plate and the edge member 33 is formed into a convex shape projecting toward the inside of the vehicle further than the base member 31 such that the upper end of the edge member 33 is prevented from greatly projecting upward further than the base member 31. The edge member 33 does not interfere with a rain channel 12 disposed at the rear portion of the opening S in the vehicle body (gutter having a drainage function at the rear edge of the opening shown in FIG. 1 and FIG. 2). As a result, the sunshade 30 can be sufficiently housed within the housing space R as necessary.

Furthermore, the edge member 33 having the handle 33a is formed of a resin with high-strength so as to obtain sufficient rigidity required for the sunshade 30. The base member 31 occupying most of the sunshade 30 can be constructed to be lightweight at a low cost, thus reducing its weight and cost. In addition, the engagement portions 33d2 engaged with the closing-direction stoppers 51 on the frame 50 are integrally provided on the edge member 33. Utilizing characteristics of the edge member 33 formed of the high-strength resin may construct the stopper mechanism in the closing direction at a low cost.

Furthermore, the edge member 33 is extended to both guide rails 40, and shoes 33d slidably engaged with the guide rails 40 are integrally provided on the extended portions. It is needless to say, in comparison with the case where the shoes are individually mounted, the accuracy in the disposed positions of the shoes 33d is improved. Additionally utilizing characteristics of the edge member 33 formed of the high-strength resin may simply construct the shoes 33d at a low cost.

Furthermore, since the edge member 33 is formed of the high-strength resin, the edge member 33 is excellent in productivity and-manufacturable at a low cost. Additionally the engagement portions 33d1 which engage with the closing-direction stoppers 51, shoes 33d which slidably engage with the guide rails 40, and bent pieces 33d1 which elastically engage with the bottom surfaces of the grooves of the guide rails 40 to suppress lateral vibrations in opened/closed state of the shade can be integrally formed when molding the edge member 33. As a result, the number of parts can be reduced.

In the aforementioned embodiment, the invention is realized by forming the edge member 33 from the high-strength resin. As the ratio of the volume of the edge member 33 in the sunshade 30 is small, even if the edge member 33 is formed of another material with high-strength such as the high-strength metal (for example, an aluminum material) the weight and cost of the sunshade can be reduced.

Furthermore in the aforementioned embodiment, although the base member 31 and edge member 33 are connected by four screws 32. For example, the bosses projecting from the edge member 33 are pierced through the base member 31 and the front ends thereof are heat-caulked, or the base member 31 is firmly held by plates which can be fitted and fixed to the receivers 33e of the edge member 33, whereby the base member 31 and edge member 33 can be connected to each other.

What is claimed is:

1. A sunshade for a vehicle sunroof comprising:
   a base member having a base layer and a skin layer which is adhered to the base layer so as to be located under the base layer which advances and retreats on guide rails provided along both sides of an opening formed in the vehicle body to open and close the opening so as to shield sunlight from striking inside the vehicle through the opening when the sunshade is closed, and is housed within a housing space formed adjacent to the opening when the sunshade is opened; and
   an edge member which is integrally mounted on an advancing-side end portion of the base member so as to be located under the skin layer, and having a shield for shielding from the field of vision of the vehicle occupant, an advancing-side terminal portion of the base member which is located in front of the advancing-side end portion.

2. The sunshade for a vehicle sunroof as set forth in claim 1, wherein the edge member has a handle at a portion exposed inside the vehicle when the sunshade is opened.

3. The sunshade for a vehicle sunroof as set forth in claim 2, wherein ventilation openings are integrally provided on the edge member.

4. The sunshade for a vehicle sunroof as set forth in claim 3, wherein the base member is formed into a substantially flat plate, the edge member is formed into a convex shape projecting toward the inside of the vehicle further than the base member, and the handle and ventilation openings are housed within the convex portion.

5. The sunshade for a vehicle sunroof as set forth in claim 1, wherein ventilation openings are integrally provided on the edge member.

6. The sunshade for a vehicle sunroof as set forth in claim 1, wherein the edge member is formed of a resin.

7. The sunshade for a vehicle sunroof as set forth in claim 6, wherein engagement portions which engage with closing-direction stoppers provided on a frame that supports the guide rails are integrally provided on the edge member.

8. The sunshade for a vehicle sunroof as set forth in claim 6, wherein the edge member is extended to the guide rails, and shoes slidably engaged with the guide rails are integrally provided on the extended portions.

9. The sunshade for a vehicle sunroof as set forth in claim 1, wherein engagement portions engaged with closing-direction stoppers provided on a frame that supports the guide rails are integrally provided on the edge member.

10. A sunshade for a vehicle sunroof comprising:

a base member which advances and retreats on guide rails provided along both sides of an opening formed in the vehicle body to open and close the opening so as to shield sunlight from striking inside the vehicle through the opening when the sunshade is closed, and is housed within a housing space formed adjacent to the opening when the sunshade is opened; and an edge member which is integrally mounted on an advancing side end portion of the base member, the edge member having a shield for shielding from the field of vision of the vehicle occupant, an advancing-side terminal portion of the base member which is located in front of the advancing-side end portion, and ventilation openings being integrally provided on the edge member.

11. A sunshade for a vehicle sunroof comprising:

a base member which advances and retreats on guide rails provided along both sides of an opening formed in the vehicle body to open and close the opening so as to shield sunlight from striking inside the vehicle through the opening when the sunshade is closed, and is housed within a housing space formed adjacent to the opening when the sunshade is opened; and an edge member which is integrally mounted on an advancing-side end portion of the base member and having a shield for shielding from the field of vision of the vehicle occupant, an advancing-side terminal portion of the base member which is located in front of the advancing-side end portion, and the edge member having a handle at a portion exposed inside the vehicle when the sunshade is being opened and ventilation openings which are intergrally provided on the edge member.

12. A sunshade for a vehicle sunroof comprising:

a base member which advances and retreats on guide rails provided along both sides of an opening formed in the vehicle body to open and close the opening so as to shield sunlight from striking inside the vehicle through the opening when the sunshade is closed, and is housed within a housing space formed adjacent to the opening when the sunshade is opened; and an edge member which is integrally mounted on an advancing-side end portion of the base member and having a shield for shielding from the field of vision of the vehicle occupant, an advancing-side terminal portion of the base member which is located in front of the advancing-side end portion, and which is formed into a convex shape projecting toward the inside of the vehicle further than the base member and which has a handle at a portion exposed inside the vehicle when the sunshade is opened and ventilation openings which are integrally provided on the edge member.

13. A sunshade for a vehicle sunroof comprising:

a base member which advances and retreats on guide rails provided along both sides of an opening formed in the vehicle body to open and close the opening so as to shield sunlight from striking inside the vehicle through the opening when the sunshade is closed, and is housed within a housing space formed adjacent to the opening when the sunshade is opened; and an edge member which is integrally mounted on an advancing-side end portion of the base member, and having a shield for shielding from the field of vision of the vehicle occupant, an advancing-side terminal portion of the base member which is located in front of the advancing-side end portion, and which is extended to the guide rails, and shoes slidably engaged with the guide rails which are integrally provided on the extended portions.

* * * * *